Patented Oct. 24, 1950

2,526,961

UNITED STATES PATENT OFFICE 2,526,961

METHOD OF PRODUCING ANTISERA OF HIGH TITRE

Rolf Meier and Karl Bucher, Basel, Switzerland, assignors to Ciba Pharmaceutical Products, Inc., Summit, N. J.

No Drawing. Application January 28, 1947, Serial No. 724,916. In Switzerland February 8, 1946

2 Claims. (Cl. 167—78)

This invention relates to a method of producing antisera of high titre.

The production of antisera of very high titre requires that the animals be injected with the desired antigen repeatedly and at suitable time intervals. By such repeated injection, the formation of antibodies is stimulated to an increased extent. However, due to sensitization of the animal to the antigen, reinjection frequently causes undesirable anaphylactic phenomena such as breathing spasms, collapse, etc. Consequently, the reinjections must be made with great care. In addition, it is not possible to reinject any desired large quantity of antigen without fear of adversely affecting the animal and of course the recovery of antiserum from the animal. As is known, the undesirable anaphylactic phenomena can be avoided with the aid of so-called antihistamine bodies. These bodies, however, have not so far been used to prepare antisera because there could be expected that by the inhibition of the anaphylactic phenomena the formation of antisera would also be inhibited.

According to the process of this invention, the occurrence of anaphylaxis can be inhibited by the administration of an antihistamine body without the formation of the antibody being affected. The antigen can be injected into the animal at the optimum time and in almost any desired quantity without having to run the risk of the occurrence of the above mentioned undesirable anaphylactic phenomena. Accordingly, it is possible to stimulate the formation of antibodies more powerfully and so to obtain sera of high strength.

The invention may be used in a wide variety of cases for the production of antibodies with antigens of various type. The recovery of the antisera is carried out by the known methods usually employed for this purpose. (Cf. e. g. Kolle, Kraus & Uhlenhut, Handbuch der pathogenen Mikroorganismen, vol II, page 176 et seq. [Jena, 1929].)

The antihistamine body may be administered orally, parenterally or otherwise. The quantity of antihistamine body and the time of administration should be so chosen that a sufficient concentration thereof should be present in the system of the animal at a time when, without that body, anaphylactic phenomena would occur. Any compound which has the property of counteracting or weakening the action of histamine may be employed including for example such compounds as: 2-(N-aryl-N-aralkyl-aminoalkyl)-imidazolines, such as 2-(N-phenyl-N-benzyl-aminomethyl)-imidazoline, 2-[N-(4'-methoxyphenyl)-N-benzyl-aminomethyl]-imidazoline, 2-[N - naphthyl-(1')-N-benzyl-aminomethyl]-imidazoline, thymoxyethyldiethylamine, 1:1-diphenyl-3-piperidino-propane, diphenylmethyldimethylamino-ethyl ether, N-aryl-N-aralkylaminoalkyl-dialkylamines, such as N-phenyl-N-benzyl-aminoethyl-dimethylamine, N-phenyl-N-benzyl-aminoethyl-diethylamine, N-phenyl-N-(para - methoxybenzyl) - aminoethyl-dimethylamine, N-phenyl-N-(para-chlorobenzyl)-aminoethyl-diethylamine, phenyl-benzyl-aminoethylpiperidine, N-pyridyl-N-aralkyl-aminoalkyl-dimethylamines, such as N-pyridyl-(2)-N-benzylaminoethyl-dimethylamine, N-pyridyl-(2)-N-(para - methoxybenzyl) - aminoethyl-dimethylamine.

The following examples illustrate the invention, but it is to be understood that they are presented by way of illustration and not limitation.

Example 1

18 rabbits are sensitized with egg albumin. 20 days later they are given an intravenous reinjection with a suitable quantity of egg albumin. One half of the animals are injected subcutaneously with 20 milligrams (per kilogram of animal) of 2-(N-phenyl-N-benzyl-aminomethyl)-imidazoline sulphate ½ hour before the aforesaid reinjection. After the reinjection the animals so treated show no externally recognizable symptoms, whereas the control animals exhibit severe anaphylactic symptoms (lying down on one side, faecal and urinary excretion, breathing spasms, etc.). Every ten days, 15 cc. of blood is taken from the animals' veins and the serum prepared therefrom by centrifuging. The formation of antibody (in this base a precipitin), which continued for 1 to 60 days, is the same in the case of the animals injected with the antihistamine body and the control animals.

Example 2

The series of tests described in Example 1 is repeated, with the exception that the animals protected with the antihistamine body are reinjected with five times the quantity of egg albumin. Notwithstanding this large dosage these animals show no anaphylactic symptoms. However, their titre of antibody thereafter (from 21 day onwards) remains 5–10 times higher than that of the control animals.

Having thus described the invention, what is claimed is:

1. In a process of producing an antiserum by the repeated injection into an animal of an antigen which, upon reinjection gives rise to undesirable anaphylactic phenomena, and then recovering the produced antiserum, the step of administering to the animal, prior to reinjection of the antigen, an antihistaminic having a chemical blocking action against histamine, thereby avoiding the said anaphylactic phenomena, whereby antiserum having a titre of enhanced magnitude may be recovered.

2. In a process of producing an antiserum by the repeated injection into an animal of an antigen which, upon reinjection gives rise to undesirable anaphylactic phenomena, and then recovering the produced antiserum, the step of administering phenyl-benzyl-aminomethyl-imidazoline to the animal, prior to reinjection of the antigen, thereby avoiding the said anaphylactic phenomena, whereby antiserum having a titre of enhanced magnitude may be recovered.

ROLF MEIER.
KARL BUCHER.

REFERENCES CITED

The following references are of record in the file of this patent:

UNITED STATES PATENTS

| Number | Name | Date |
|---|---|---|
| 2,268,990 | Loewe | Jan. 6, 1942 |
| 2,301,532 | Fell | Nov. 10, 1942 |

OTHER REFERENCES

"Standard Methods," Wadsworth, 3d ed. (1947), pages 63–65, 680, 681. (Copy in Div. 43.)

Feinberg, "Histamine and Antihistaminic Agents," in J. A. M. A., Nov. 23, 1946, volume 132, pages 702–713.

Hartman in California Medicine, volume 66, Apr. 1947, pages 242–248.